Figure 1:
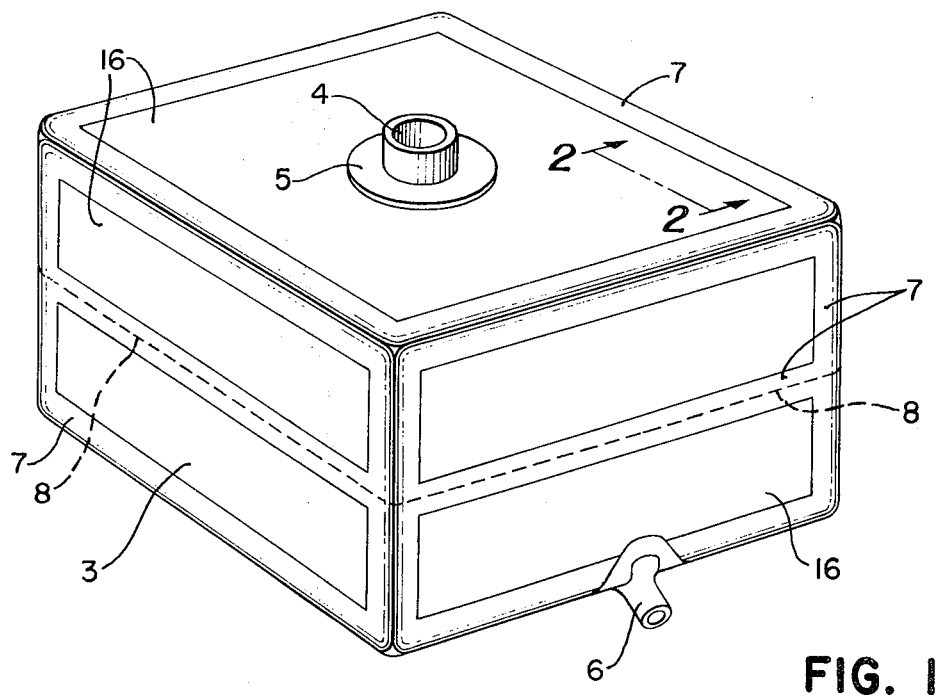

United States Patent [19]

Suter

[11] 3,951,190

[45] Apr. 20, 1976

[54] HEAT-RESISTANT FUEL CELL

[75] Inventor: Charles A. Suter, Stow, Ohio

[73] Assignee: Goodyear Aerospace Corporation, Akron, Ohio

[22] Filed: Aug. 16, 1974

[21] Appl. No.: 498,153

Related U.S. Application Data

[63] Continuation-in-part of Ser. No. 215,382, Jan. 4, 1972, abandoned.

[52] U.S. Cl. ............................. 150/.5; 220/63 A; 220/85 B; 244/135 B; 428/35; 428/215; 428/252; 428/425
[51] Int. Cl.² ................ B65D 85/00; B64D 37/02; B32B 1/02
[58] Field of Search ................ 244/135 R, 135 B; 150/.5, 1; 161/184, 190, 227, 231, 256, 92, 405; 260/845; 220/63 A, 85 B; 428/35, 250, 252, 425, 912, 215

[56] References Cited
UNITED STATES PATENTS

| 2,626,882 | 1/1953 | Gerke | 161/405 |
|---|---|---|---|
| 2,705,223 | 3/1955 | Renfrew et al. | 161/184 |
| 3,129,014 | 4/1964 | Hutchison et al. | 161/405 |
| 3,492,393 | 1/1970 | Nourot et al. | 161/190 |
| 3,577,314 | 5/1971 | Evans | 220/83 |
| 3,616,189 | 10/1971 | Harr | 161/190 |
| 3,656,530 | 4/1972 | Evans et al. | 220/83 |
| 3,692,742 | 9/1972 | Underwood | 161/190 |
| 3,702,841 | 11/1972 | Sawko | 260/845 |

OTHER PUBLICATIONS

*The Condensed Chemical Dictionary*, 5th Ed., Reinhold, 1956, p. 1125.
Zimmerman and Lavine, "Handbook of Material Trade Names," 1953 Ed., Industrial Research Service, p. 448.

Primary Examiner—William J. Van Balen
Assistant Examiner—Charles E. Lipsey
Attorney, Agent, or Firm—F. W. Brunner; J. D. Wolfe

[57] ABSTRACT

A container capable of passing the temperature requirements of U.S. Defense Department Specification MIL-T-25783 B and C (ASG) Tank, Fuel Aircraft and Missile Non-Self Sealing High Temperature Removable consisting of an inner layer of polyurethane elastomer of 2 to 30 mils adhered to at least one ply of nitrile rubber coated polyester fabric, said ply of nitrile rubber being adhered to an inner side of a barrier layer of a polyamide epoxy resin mixture and a nitrile rubber compounded with phenolic resin being used as a tie coat between the barrier and the polyester fabric.

3 Claims, 2 Drawing Figures

U.S. Patent  April 20, 1976  3,951,190

HEAT-RESISTANT FUEL CELL

This application is a continuation-in-part of application Ser. No. 215,382, filed Jan. 4, 1972, now abandoned.

This invention relates to a high temperature fuel cell or related equipment. More particularly, this invention relates to tanks or fuel containters for aircraft and missiles which meet the high temperature requirements when exposed to temperatures of at least 300°F.

As the speed of aircraft have increased the demands on the fuel tank and related fuel containers have increased proportionately, not only in the strains and stresses the fuel cells or tanks are required to withstand, but also in the temperature range. The magnitude of these more severe strain-stress relationships with increasing temperature is reflected in U.S. Defense Department Specification MIL-T-25783 B and C (ASG) Tank, Fuel Aircraft and Missile Non-Self Sealing High Temperature Removable. Consequently, different classes of cells are provided. Class 1 operates at a maximum temperature of 300°F. and Class 2 cells operate at a maximum temperature of 350°F. as interpreted by the industry committee.

Heretofore, those of ordinary and even expert skill in the rubberized fabric fuel cell or tank art have considered the usual materials of construction, viz. natural and synthetic rubbers, polyamide or polyester fabrics and nylon barriers would not be able to withstand a temperature appreciably higher than 250°F. without the cell failing and beginning to leak fuel. Consequently, the use of the natural and synthetic rubbers have been abandoned by those who were attempting to make high temperature fuel cells replaced with the highly fluorinated polyalkylene type materials. The use of the highly fluorinated polyalkylene type materials introduces construction difficulties, increases the labor requirements and furthermore, the highly fluorinated polyalkylenes are relatively more expensive than the conventional rubbers.

An object of this invention is to provide a method of making a high temperature resistant fuel cell which utilizes the conventional fuel cell building techniques and elastomer and is suitable for use at 300°F. and 350°F. as described by MIL-T-25783 B and C (ASG) specification as interpreted by industry committee.

Figure 2:
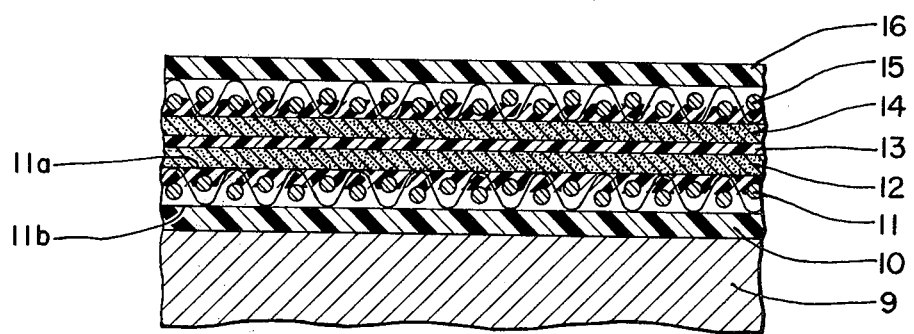

The nature of this invention and further objects will be apparent from the drawings wherein FIG. 1 is a perspective view of a finished fuel cell made in accordance with this invention, and FIG. 2 is a cross section through FIG. 1 along the line 2—2 with mold shown in dotted outline.

Referring specifically to FIG. 1, the finished fuel cell 3 is shown essentially in a rectangular configuration, although it is understood any configuration can be used. The fuel cell has a filling opening 4 with the usual flange or opening-closing member 5 and also other access fittings 6 for emptying the tank. Also, reinforcing plies 7 are shown at the corners and along a seam 8.

The actual construction of the fuel cell acan be understood and appreciated more readily by reference to FIG. 2 where the relationship of the various plies and coatings are shown.

A mold 9 such as plaster of paris, cardboard or rigid frangible foam construction can be used to build the fuel cell. Over the mold there is applied a coating of a well-known parting agent such as water soluble protein glue or water-alcohol soluble polyvinyl alcohol resin, or other suitable and well-known release agents. Then a polyurethane coating 10 is applied over the form by suitable application techniques, for instance, spraying or painting. Over the polyurethane coating 10, a fabric ply 11 is laid up in the conventional manner. This coated fabric ply consists of woven polyester cloth which preferably has been dipped in an isocyanate fabric dip to facilitate adhesion to rubber and coated with a butadiene-acrylonitrile rubber compound on one side 11a only. The uncoated side 11b of the fabric is placed against the uncured polyurethane coating.

An adhesive coat 12 is applied over the rubber coated fabric before the barrier coat 13 is applied. The barrier coat is applied as a mixture of alcohol-soluble polyamide resin, epoxy resin and an epoxy catalyst. The barrier coat usually is about 0.25 to 5 mils thick with the preferred thickness being 1 to 2 mils.

An adhesive coat 14 is applied to the barrier coat 13 and then another coated fabric ply 15 is applied with coated side against the adhesive. An outer polyurethane coat 16 is applied over the fabric ply 15 to give the finished cell construction shown in FIG. 2. This cell is cured and the building mold removed in the customary manner through the opening after the mold's destruction.

The nature of this invention can be more readily appreciated and understood from the following illustrative and representative examples, wherein all parts and percentages are by weight unless otherwise designated.

EXAMPLE

A plaster of paris fuel cell mold was coated with a water soluble glue solution as a parting agent and allowed to air dry.

A polyurethane reaction mixture was formed by reacting 1 mole of a mixture of 1000 molecular weight polytetramethylene adipate and 2000 molecular weight polytetramethylene azelate with 2 mols of methane-4,4'-bis(cyclohexyl diisocyanate) to form a prepolymer and then adding about 0.7 to 0.95 of a mole of methylene dianiline. The polyurethane reaction mixture is preferably applied by spraying as a solution in toluene, xylene and/or acetone or methyl ethyl ketone. Usually sufficient of the polyurethane reaction mixture is painted, dipped or sprayed on the mold to give a coating 2 to 30 mils thick with the preferred thickness being 5 to 10 mils.

Over the still tacky polyurethane coating is applied the uncoated side of the coated fabric described below. The coated fabric is applied by cutting into suitable strips and applying each strip over the mold to form covering over the mold having at least one lapped seam. The seams are cemented using a solvent (viz. methyl ethyl ketone) cement of butadiene-acrylonitrile rubber, usually of about 5 to 25%.

The coated fabric consisted of woven polyester cloth of 8-ounce weight which was spread coated on one side only with a methyl ethyl ketone solution of acrylonitrile-butadiene rubber compounded with 3 parts of ethyl tuads,* 0.5 parts or less elemental sulfur, 20 parts silica and 30 parts magnesium oxide to give a rubberized fabric. The preferred loading is 30 to 70 parts of silica or magnesium oxide for each 100 parts of rubber.

\* tetraethyl thiuram disulfide

The coated fabric ply on the form was painted or spray coated with an adhesive comprising a methyl ethyl ketone solution of 10 to 20% of the above compounded acrylonitrile-butadiene rubbers and 20% phenol formaldehyde resin to give a tie coat.

Then a barrier coat was painted on over the tie coat. This barrier coat was about 0.25 to 5 mils thick with the preferred thickness being 1 to 2 mils. The barrier material that was painted on the mold was a mixture of 65 to 90% of an ethhanol soluble nylon (a high molecular weight polyamide having a melting point of about 128°C.), 35 to 10% of a bis phenol A epoxy resin (Epon 828 from Shell Chemical Co.) and less than 1% of 2,4,5-tri(dimethyl-amino-methyl) phenol as catalyst.

Over the barrier layer another tie coat 14 of the adhesive of the type described for tie coat 12 is applied and of commensurate thickness. Then a layer 15 of coated fabric is hand laid up in the manner described for the ply 11 (coated side against the tie coat). Over the fabric layer which can be one or more plies a polyurethane coating is applied.

The built-up fuel cell on the mold is then placed in an autoclave and cured either with live steam at about 240°F. for approximately 200 minutes, or in an atmosphere of pressurized nitrogen for the same time and temperature. It should be appreciated that where live steam is used certain specific polyurethanes are preferred such as the polyetherurethanes and the so-called hydrolysis resistant polyesterurethanes which will be described in greater detail hereinafter.

In lieu of curing with live steam, hot air or nitrogen may be used but in this case the pressure developed inside the autoclave by the use of air and nitrogen should be essentially equivalent to or higher than that of live steam at 240°F.

The nitrile rubbers useful in this invention are well known and the preferred grades are frequently referred to in the trade as medium to low level acrylonitrile-butadiene copolymers with the acrylonitrile level in the copolymer being about 10 to 50% by weight and the preferred range being 15 to 40%.

Likewise, it is desirable to compound these nitrile rubbers on a parts per 100 basis at a low sulfur level, i.e. 1 to 0 part of free sulfur and a high mineral filler loading usually about 20 to 100 parts of the powdery inert fillers; particularly preferred fillers are silica, magnesium oxide, and calcium silicate. The nitrile rubbers used to coat the polyester fabric and as the tie coat more desirably is compounded with about 10 to 40, and preferably 15 to 35 parts of a phenol-aldehyde resin to aid in getting a satisfactory bond between the coated polyester fabric and the polyamide barrier layer. The nature of these phenolic resins is discussed in regard to production and use in David F. Gould's book, *Phenolic Resins*, copyrighted in 1959 by Reinhold Publishing Corporation, with the preferred aldehydes being formaldehyde and furfural and the phenols being phenol, resorcinol, and the alkylated phenols having alkyl radicals of 1 to 12 carbon atoms. The preferred alkyl radicals are tertiary butyl and tertiary amyl. Generally the preferred phenol-aldehyde resins are those soluble in acetone and methyl ethyl ketone as they can be more readily and easily incorporated in the nitrile rubber as their ketone solution rather than adding them as a powder where they are not ketone soluble.

The barrier compositions useful in this invention are the polyamide of the type and grade well known for fuel cell barriers such as Nylon 6-6. Normally the nylon is dissolved or dispersed in ethanol, propanol or mixtures to permit the dispersion to be painted on by spraying, brushing, rolling or other known techniques. The nylon dispersion preferably contains 35 to 10 percent, based on the weight of nylon, of any of the epoxy resin and catalyst of the well known epoxy resin-curative type such as the carboxylic acids, amines and amides. Of the many useful varieties of epoxy resins useful in this invention, the bis phenol A epoxy resins and the epoxy resins of the olefins and polymers of olefins each having from 2 to 20 carbon atoms are most readily available and usable. A few of the many well known epoxy catalysts are enumerated to illustrate some preferred species: any of the organic monoamines, organic diamines, triamines and tertiary amines where organic radicals are alkyl, aryl, and cycloalkyl and mixtures of those having 1 to about 20 carbon atoms, the organic acids of aliphatic, aromatic and cycloaliphatic classes where the acid is monocarboxylic or polycaboxylic of about 1 to 20 carbon atoms and the amides and polyamides of these acids.

Although any of the well known polyurethanes or polyurethane reaction mixtures can be utilized in this invention, it must be appreciated that the curing is preferably done in an autoclave at a temperature of 240°F. to 275°F. in an inert atmosphere for at least about 100 minutes.

For a very preferred product which is more readily cured with live steam in a pressure chamber and exhibits phenomenal resistance to hydrolysis or deterioration in the tropics, the so-called hydrolysis resistant polyurethanes are preferred. A very satisfactory hydrolysis resistant polyurethane for the polyurethane layers of the cell are the reaction product of a mole of a polyester having a molecular weight of 800 to 2500 selected from polyhexamethylene adipate, polyhexamethylene azelate and polytetramethylene adipate, 1.6 to 3.5 moles of 4,4'-dicyclohexylmethane diisocyanate (hydrogenated MDI) and 0.75 to 1.0 moles of an aromatic diamine such as listed in U.S. Pat. No. 3,036,996.

Still another satisfactory hydrolysis resistant polyurethane are those made using the polyether polyols such as polypropylene or polytetramethylene ether glycol or triol with the alicyclic or aliphatic diisocyanates with hydrogenated MDI being preferred relative to toluene diisocyanate or MDI.

A liquid polyurethane reaction mixture comprising a reactive hydrogen material selected from the class of polyester polyols, polyether polyols and the hydrocarbon polyols of diol to hexols, organic polyisocyanates comprising a 100 parts of aromatic diisocyanate and 1 to 100 parts of an aliphatic or cycloaliphatic diisocyanate plus crosslinkers of monomeric polyol, polymeric polyol or polyamines of such as disclosed in U.S. Pat. No. 3,036,996 yield excellent water-resistant coatings. The nature of these polyurethanes are described in fuller detail in copending application Ser. No. 21,481, filed Mar. 20, 1970.

The industry committee interpretation referred to heretofore is a report for AE-5B members of the 16th of May, 1969 by the Committee composed of J. D. Galloway, L. P. Parkinson and H. D. Smith on the subject "High Temperature Fuel Tank Specification MIL-TL-25783 C (ASG), Recommended Revisions Final Draft." This report provided for class of fuel container useful up to 350°F. (i.e. maximum recommended temperature for the class) and fuel temperature of 180°F. where A cube slosh test with $T_f$ fuel called for the cube to be heated for 120 hours at $T_w$-50 (or 300°F. for Class 2 container to be useful up to 350°F), then refilled with fuel and checked for leaks. Then B cube was heated for 20 hours at $T_w$ for 350°F.

maximum of Class 2, then filled with fuel and defueled before being heated for 120 hours at $T_{ic}$-50 and placed on stand test filled with fuel to check for leakage. These test conditions are referred to as 40 hours at 350°F. at fuel temperature of 180°F.

While certain representative embodiments and details have been shown for the purpose of illustrating the invention, it will be apparent to those skilled in this art that various changes and modifications may be made therein without departing from the spirit or scope of the invention.

What is claimed is:

1. A container suitable for use at temperatures up to 350°F. maximum consisting of an innerlayer of polyurethane elastomer of 2 to 30 mils adhered to at least one ply of nitrile rubber coated fabric of polyester, said ply of nitrile rubber being adhered to an inner side of a barrier layer 0.25 to 5 mils thick with a tie coat of nitrile rubber compounded with a phenolic resin, an outer side of said barrier layer being adhered by said tie coat to at least one ply of a nitrile rubber coated polyester fabric, and the nitrile rubber coated fabric being coated on the outside thereof with a coat of polyurethane elastomer, said polyurethane comprising a reaction product of 4,4'-dicyclohexyl methane diisocyanate, and a reactive hydrogen material selected from the class consisting of polyester polyol and polyether polyol.

2. The container of claim 1 wherein the barrier layer is a mixture composed of 65 to 90 percent by weight of a polyamide and 35 to 10 percent by weight of epoxy resin.

3. The container of claim 1 wherein the nitrile rubber coated fabric consists essentially of a nitrile rubber compounded with a sulfur curative comprising three parts of tetraethyl thiuram disulfide, one to zero parts of free sulfur and 20 to 100 parts of powdered mineral filler per hundred parts of nitrile rubber.

* * * * *